US007457690B2

(12) United States Patent
Wilson, Jr. et al.

(10) Patent No.: US 7,457,690 B2
(45) Date of Patent: Nov. 25, 2008

(54) SYSTEMS AND METHODS FOR REPRESENTATION OF A FLIGHT VEHICLE IN A CONTROLLED ENVIRONMENT

(76) Inventors: Robert C. Wilson, Jr., 19433 SE. 266th St., Covington, WA (US) 98042; Ted D. Whitley, 127-7 Lopez Rd., Lopez Island, WA (US) 98261; Regina Estkowski, 6331 Glade Ave., #H111, Woodland Hills, CA (US) 91367

( * ) Notice: Subject to any disclaimer, the term of this patent is extended or adjusted under 35 U.S.C. 154(b) by 447 days.

(21) Appl. No.: 11/304,229

(22) Filed: Dec. 14, 2005

(65) Prior Publication Data

US 2007/0150127 A1 Jun. 28, 2007

(51) Int. Cl.
*G06F 19/00* (2006.01)
*G05D 1/00* (2006.01)

(52) U.S. Cl. .......................................... 701/3; 701/120

(58) Field of Classification Search ....................... None
See application file for complete search history.

(56) References Cited

U.S. PATENT DOCUMENTS 4,402,479 A * 9/1983 Phipps et al. ............... 244/116
5,381,140 A * 1/1995 Kuroda et al. ............... 340/961
5,627,546 A * 5/1997 Crow ......................... 342/352
6,393,358 B1 * 5/2002 Erzberger et al. ........... 701/120
6,681,158 B2 * 1/2004 Griffith et al. .................. 701/3
6,799,094 B1 * 9/2004 Vaida et al. .................... 701/3
6,950,037 B1 9/2005 Clavier et al.
RE39,053 E 4/2006 Rees
7,136,016 B1 11/2006 Swensen et al.
7,194,353 B1 3/2007 Baldwin et al.
7,306,187 B2 * 12/2007 Lavan ................... 244/123.11
2003/0193409 A1 * 10/2003 Crank ........................ 340/970
2004/0078136 A1 4/2004 Cornell et al.
2004/0193362 A1 * 9/2004 Baiada et al. ............... 701/120

FOREIGN PATENT DOCUMENTS

JP 10-285099 A * 10/1998
RU 2176852 C2 * 12/2001
WO WO0041153 7/2000

* cited by examiner

*Primary Examiner*—Michael J. Zanelli

(57) ABSTRACT

Systems and methods for representing a flight vehicle in a controlled environment are disclosed. In one embodiment, a system comprises a communications link that extends between a ground-based facility and at least one flight vehicle operating within the controlled environment that is operable to communicate trajectory data between the ground-based facility and the at least one flight vehicle, and a processor configured to generate the trajectory data.

20 Claims, 3 Drawing Sheets

SYSTEMS AND METHODS FOR REPRESENTATION OF A FLIGHT VEHICLE IN A CONTROLLED ENVIRONMENT

FIELD OF THE INVENTION

This invention relates generally to information systems, and more specifically, to information systems for air traffic control.

BACKGROUND OF THE INVENTION

Various aviation regulatory agencies exist that regulate flight operations within a defined airspace environment. For example, within the United States, the Federal Aviation Administration (FAA) maintains regulatory and control authority within various segments of the National Airspace System (NAS). Accordingly, the FAA has established various enroute structures that provide for the safe and efficient movement of aircraft throughout the U.S. The enroute structures (e.g., the low and high altitude structures) are further organized into a plurality of air routes that extend to substantially all portions of the country, and are configured to provide suitable terrain clearance for aircraft navigating along a selected air route while simultaneously permitting uninterrupted navigational and communications contact with ground facilities while the aircraft navigates along the route. In addition, suitable air surveillance radar facilities have been established within the NAS so that continuous radar surveillance of all aircraft within the enroute structures is presently available.

In general terms, aircraft movements during the departure, enroute, and approach phases of flight are managed by one or more ground-based facilities (e.g., an enroute air route traffic control center (ARTCC), a terminal radar approach control facility (TRACON), an airport control tower or even a Flight Service Station (FSS)) to cooperatively control the release of traffic from a departure airport, and to guide the aircraft into the enroute structure. In particular, the foregoing facilities provide appropriate sequencing and positioning of the aircraft during all phases of flight, so that a required separation between aircraft exists. Presently, traffic spacing considerations are determined principally by a conservative estimation of an uncertainty associated with a positional location, and is generally strictly maintained by the controlling ground-based facility.

Although the present configuration and management of the NAS provides for the safe and efficient management of air traffic, numerous disadvantages exist. For example, the volume of traffic that may be accommodated on the route is often limited due to traffic spacing requirements, which generally contributes to substantial departure delays at airports. Further, since the air routes in the enroute structure generally extend between ground-based navigational aids (NAVAIDS), in the event that one or more NAVAIDS along a selected air route is not operative, traffic may be routed onto other air routes, which further contributes to air route congestion and departure delays.

Still other disadvantages exist in the present configuration and management of the NAS. In particular, the present ground-based navigational and surveillance systems, such as NAVAIDS and surveillance radar systems, respectively, are costly to install and maintain. Further, the ground-based control facilities require significant numbers of highly trained personnel to observe the air traffic and to provide instructions to the aircraft, usually by means of voice communications.

Consequently, present control facilities are highly labor-intensive, further increasing the overall cost of the current air traffic control system.

Accordingly, what is needed in the art is a system and method to manage and positively control aircraft in a controlled flight environment.

SUMMARY

The present invention comprises systems and methods for representing a flight vehicle in a controlled environment. In one aspect, a system comprises a communications link that extends between a ground-based facility and at least one flight vehicle operating within the controlled environment that is operable to communicate trajectory data between the ground-based facility and the at least one flight vehicle, and a processor configured to generate the trajectory data.

BRIEF DESCRIPTION OF THE DRAWINGS

Embodiments of the present invention are described in detail below with reference to the following drawings.

DETAILED DESCRIPTION

The present invention relates to systems and methods for the representation of flight vehicles in a controlled environment. Many specific details of certain embodiments of the invention are set forth in the following description and in FIGS. 1 through 5 to provide a thorough understanding of such embodiments. One skilled in the art, however, will understand that the present invention may have additional embodiments, or that the present invention may be practiced without several of the details described in the following description.

Figure 1:
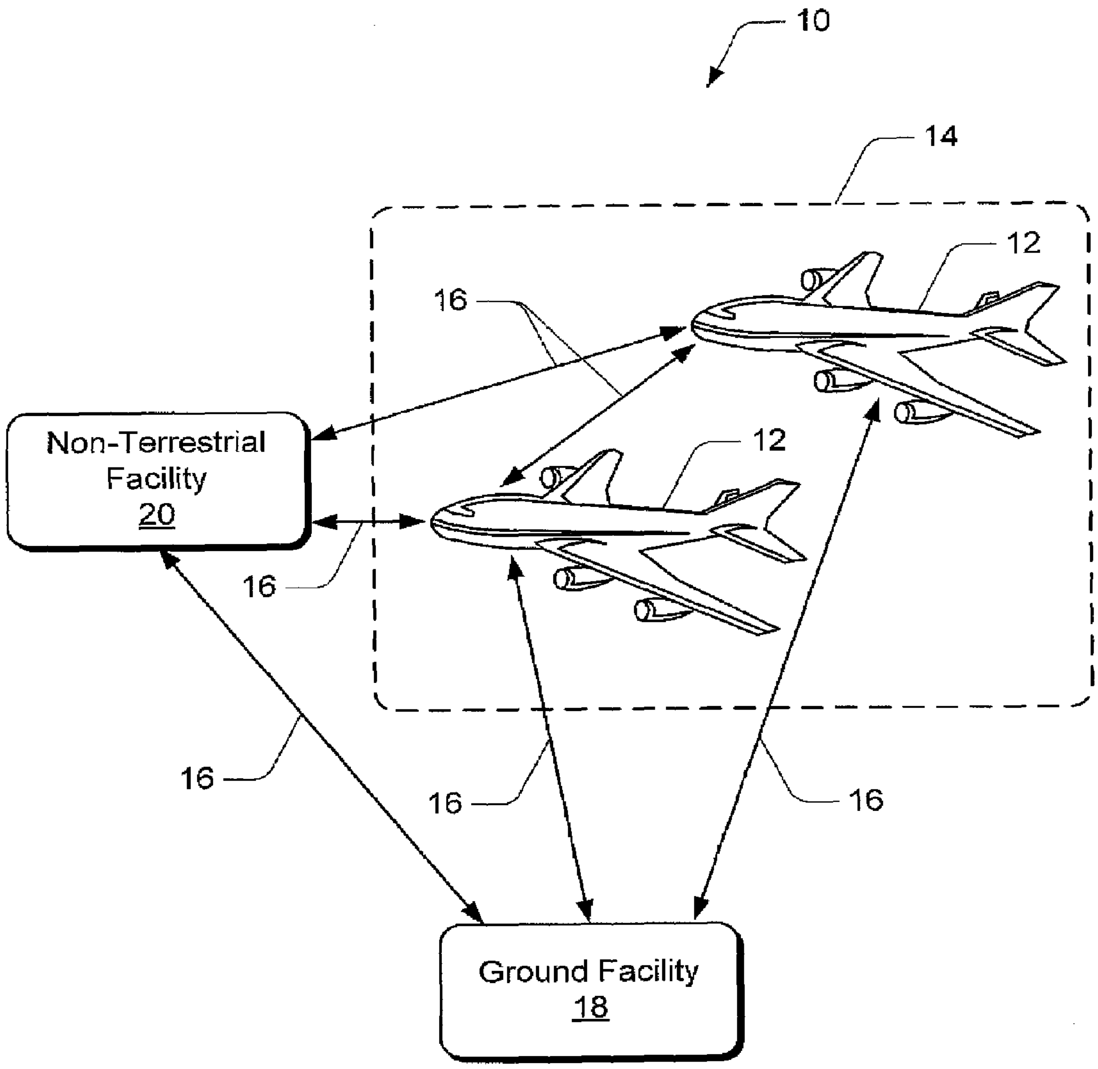
FIG. 1 is a diagrammatic view of a system for representing a flight vehicle in a controlled environment, according to an embodiment of the invention.

FIG. 1 is a diagrammatic view of a system 10 for representing a flight vehicle in a controlled environment, according to an embodiment of the invention. In the description that follows, the controlled environment includes any airspace environment where the flight vehicle may be subject to positive control. Accordingly, the airspace environment includes the known low altitude and high altitude airspace structures, and may also include other selected airspace structures, such as transition airspace structures, approach and/or departure airspace structures, and other known airspace structures where the flight vehicle may be under positive control. In the system 10 shown in FIG. 1, one or more suitably equipped aircraft 12 navigate within a controlled airspace environment 14. The aircraft 12 are configured to communicate the trajectory data 16 to at least one ground facility 18 that is operable to process the trajectory data 16, and/or monitor the trajectory data 16. The aircraft 12 may also communicate trajectory data 16 between the one or more aircraft 12 within the controlled environment 14. Accordingly, the ground facility 18 may include an air traffic control facility, such as any one of the aforementioned ground-based facilities, such as an ARTCC, a TRACON, an airport-based control tower or even a FSS. The trajectory data 16 may be directly communicated to the ground facility 18 (e.g., by radio frequency communications) and/or by means of a signal relay path to a non-terrestrial facility 20, such as an orbital communications satellite, or even a non-orbital vehicle, such as an aerostat, or other known vehicles capable of providing a desired signal relay path. Suitable communications devices are known that permit the one or more aircraft 12 to communicate with the orbital communications satellite, such as by means of a broadband Internet (VSAT) service, available from AG SatCom, Inc. of Richardson Tex., although other suitable alternatives exist. The ground facility 18 may also be configured to communicate the trajectory data 16 using a terrestrial communications network, such as the well-known Aircraft Communications Addressing and Reporting System (ACARS), available from Aeronautical Radio, Incorporated of Annapolis, Md. Other embodiments of the foregoing system for representing a flight vehicle in a controlled environment are disclosed in detail in U.S. application Ser. No. 10/955,579, filed Sep. 30, 2004 and entitled "Tracking, Relay and Control Information Flow Analysis for Information-Based Systems, which application is commonly owned by the assignee of the present application and is herein incorporated by reference.

The trajectory data 16 will now be discussed in greater detail. The trajectory data 16 may include at least one of an actual trajectory data stream, a command trajectory data stream, and a predicted trajectory data stream. The actual trajectory data stream includes data that reflects the actual course, position, altitude and speed for the aircraft 12. Additionally, the actual trajectory data stream includes identification data for the aircraft 12, which may include a preferred aircraft call sign, a communications frequency for the identified aircraft, and other data that may be used to assess the performance of the aircraft 12. For example, various performance data for the aircraft 12 are available from various aircraft systems so that the actual trajectory data stream may include an attitude for the aircraft 12, a throttle setting for the aircraft 12, and a control surface position for the aircraft 12. The command trajectory data stream includes data that communicates a selected course (e.g., a selected "vector", which is presently understood in air traffic control systems), a selected altitude for the aircraft 12, and a selected airspeed for the aircraft 12. Additionally, the command trajectory data stream may include data that may be used to determine if the aircraft 12 is conforming to the selected course, altitude and airspeed. The predicted trajectory data stream includes data that enables the system 10 to prospectively verify that an appropriate aircraft spacing will be maintained when the command trajectory data stream is implemented. For example, it is known that the aircraft 12 must be appropriately spaced from other aircraft within the controlled environment 14. In general terms, a first minimum aircraft spacing applies to aircraft that are navigating in the enroute structure, while a second minimum aircraft spacing is maintained while the aircraft are located within an approach structure. Still other appropriate aircraft spacing distances may be used in still other controlled environments. The predicted trajectory data stream may also include other data relating to minimum altitudes for the aircraft 12 while the aircraft 12 is navigating within a selected airspace structure in the controlled environment 14. For example, the predicted trajectory data stream may include a minimum terrain clearance altitude when the aircraft 12 is navigating in the low altitude structure. The predicted trajectory data stream may also include a minimum enroute altitude that is configured to assure consistent communications between various ground communication stations while the aircraft 12 is navigating in the low altitude structure and/or the high altitude structure. Still other minimum and/or maximum parameter values that are applicable to the aircraft 12 and/or the selected route may also be included in the predicted trajectory data stream.

The actual trajectory data stream, the command trajectory data stream and the predicted trajectory data stream may cooperatively enhance the reliability of data communications to the system 10 by mutually providing redundant communications paths. Accordingly, if at least a portion of the command and/or predicted trajectory data stream is interrupted or otherwise experiences a "data dropout", the actual trajectory data stream may include the interrupted portion so that communications continuity for the command and/or predicted trajectory data stream is assured. Further, if at least a portion of the actual and/or predicted trajectory data stream is interrupted, the command trajectory data stream may include the interrupted portion to provide communications continuity. Similarly, if at least a portion of the actual and/or command trajectory data stream is interrupted, the predicted trajectory data stream may include the interrupted portion. In particular, the actual trajectory data stream, the command trajectory data stream and the predicted trajectory data stream may cooperatively ensure that the aircraft 12 is maintaining a predetermined course, altitude and speed so that a required aircraft spacing is maintained within the controlled environment 14. Other embodiments of the trajectory data are disclosed in detail in U.S. application Ser. No. 11/096,251, filed Mar. 30, 2005 and entitled "Trajectory Prediction", which application is commonly owned by the assignee of the present application and is herein incorporated by reference.

Figure 2:
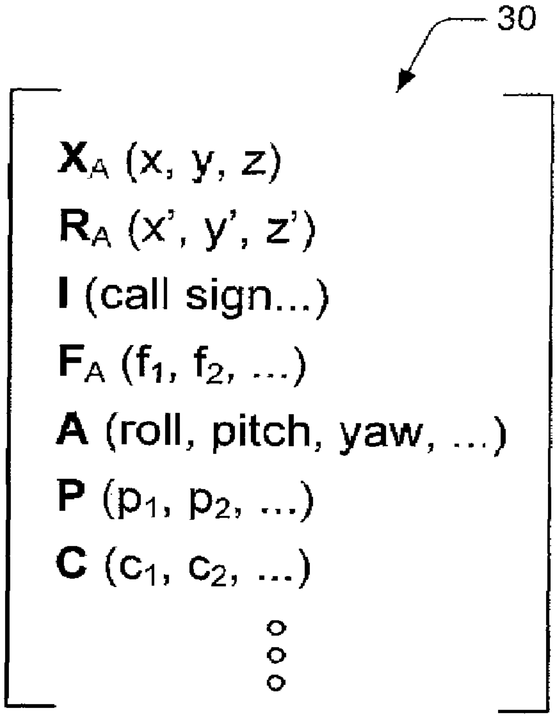
FIG. 2 is a diagrammatic view of an actual trajectory matrix, according to another embodiment of the invention.

FIG. 2 is a diagrammatic view of an actual trajectory matrix 30, according to an embodiment of the invention. The actual trajectory matrix 30 includes an actual positional vector $X_A$ that further includes spatial components (x, y and z) relative to a selected origin. The origin may be located at a departure airport, or it may be located at an existing NAVAID. Alternately, the spatial components may be geographical coordinates obtained from a satellite-based navigational system, such as the well-known GPS navigational system. The actual trajectory matrix 30 may also include an actual rate vector $R_A$ that includes rate values corresponding to the spatial components present in the actual positional vector $X_A$. An aircraft identification vector I may also be included in the actual trajectory matrix 30. Accordingly, the vector I may include an aircraft call sign (e.g., an aircraft registration number), or other acceptable identifiers, such as a name of an operator and the scheduled flight number. Still other identifiers may be used, provided that the selected identifier permits the aircraft to be unambiguously distinguished from other aircraft operating within the controlled environment 14, as shown in FIG. 1.

Still referring to FIG. 2, the actual trajectory matrix 30 may also include a frequency vector $F_A$ that includes one or more radio frequencies pertinent to the controlled operation of the aircraft. For example, the vector $F_A$ may include an assigned communications frequency, a communications frequency corresponding to an adjacent sector in the controlled environment, a frequency corresponding to a desired navigational aid (NAVAID), one or more private (or "company") frequencies, or other similar radio frequency information. Other information may be desirably included in the actual trajectory matrix 30 that is directed to operational parameters of the aircraft. For example, an aircraft attitude vector A may be present that describes the attitude of the aircraft. Accordingly, the attitude vector A may include a roll angle, a pitch angle, and a yaw angle for the aircraft. Similarly, a power setting vector P may also be present that suitably includes components that reflect one or more throttle settings for respective propulsion units positioned on the aircraft. The actual trajectory matrix 30 may also include a control surface vector C that includes positional information for the aircraft. Pertinent positional information may include an aileron, rudder and elevator deflection relative to a neutral position, and/or an aileron, rudder and elevator trim position for the aircraft. Still other pertinent control surface information may also include a flap and/or a spoiler deployment. The actual trajectory matrix 30 may be formatted in any suitable form that permits matrix 30 to be conveniently communicated between the aircraft and other aircraft and/or ground-based facilities.

Figure 3:
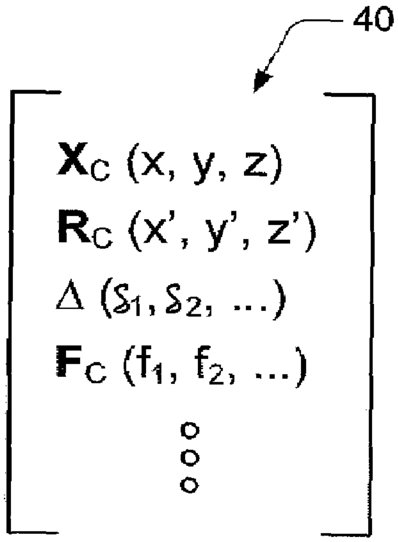
FIG. 3 is a diagrammatic view of a command trajectory matrix, according to another embodiment of the invention.

FIG. 3 is a diagrammatic view of a command trajectory matrix 40, according to an embodiment of the invention. The command trajectory matrix 40 includes a command positional vector $X_C$ that includes spatial components (x, y and z) that describe coordinates a commanded position for the aircraft. The command trajectory matrix 40 may also include a command rate vector $R_C$ that includes rate values corresponding to the spatial components present in the command positional vector $X_C$. The command rate vector $R_C$ accordingly includes rate components that direct the aircraft to the position indicated in the command positional vector $X_C$. Alternately, the command positional vector $X_C$ may include command deviation vector $\Delta$ that includes at least one positional deviation component ($\delta_1$, $\delta_2$ . . . ) that provides a required course deviation so that the command positional vector $X_C$ is achieved. Still other vectors may be included in the command trajectory matrix 40. For example, a command frequency vector $F_C$ may include one or more communications frequencies and/or other radio frequencies for NAVAIDS that communications devices and/or navigational devices within the aircraft are expected to use as the aircraft conforms to the command positional vector $X_C$.

Figure 4:
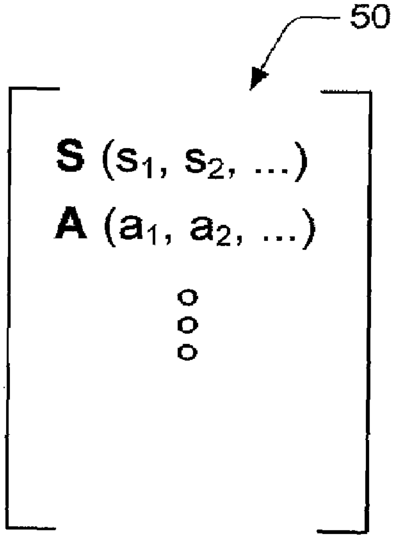
FIG. 4 is a diagrammatic view of a predicted trajectory matrix, according to another embodiment of the invention.

FIG. 4 is a diagrammatic view of a predicted trajectory matrix 50, according to an embodiment of the invention. The predicted trajectory matrix 50 includes a predicted spacing vector S that includes at least one component that describes a minimum permissible spacing between aircraft that are navigating within the controlled environment 14, as shown in FIG. 1. The at least one component describing the aircraft spacing may be varied as the aircraft navigates in different airspace structures within the controlled environment 14. For example, when the aircraft is within the enroute structure, the aircraft is spaced apart from other aircraft in the enroute structure by a first minimum spacing. If the aircraft is navigating in the approach structure, a second minimum spacing may apply, that is generally less than the first minimum spacing. Still other aircraft spacing components may be included in the predicted spacing vector S, which generally depends upon the particular portion of the controlled environment 14 that the aircraft is positioned within.

Still referring to FIG. 4, the predicted trajectory matrix 50 may also include an altitude vector V that includes minimum altitudes for the aircraft. For example, minimum altitudes that may be included in the altitude vector V may include a minimum enroute altitude and/or a terrain clearance altitude. Other minimum altitudes may include a minimum altitude for the aircraft while the aircraft is positioned within the approach structure, such as a decision height (DH) for a precision approach, and/or minimum descent altitude (MDA) for a non-precision approach. Although not shown in FIG. 4, the predicted trajectory matrix 50 may also include a predicted positional vector $X_P$ that further includes spatial components (x, y and z) relative to a selected origin, and may also include a predicted rate vector $R_P$ that includes rate values corresponding to the spatial components present in the predicted positional vector $X_P$. The predicted trajectory matrix 50 may also include a predicted window vector W that contains predict window times that may be used to obtain the predicted positional and rate vectors $X_P$ and $R_P$.

The predicted trajectory matrix 50 may further include multiple predicted positional and predicted rate vectors, such that the predicted vectors reflect a predicted position and a predicted rate corresponding to multiple predict windows. The predicted trajectory matrix 50 may further include probability distribution and confidence region vectors. Components of these vectors may be in the form of an index into a look-up table. For example, a look-up table entry may consist of a vector of parameters that determine a particular error ellipse.

Figure 5:
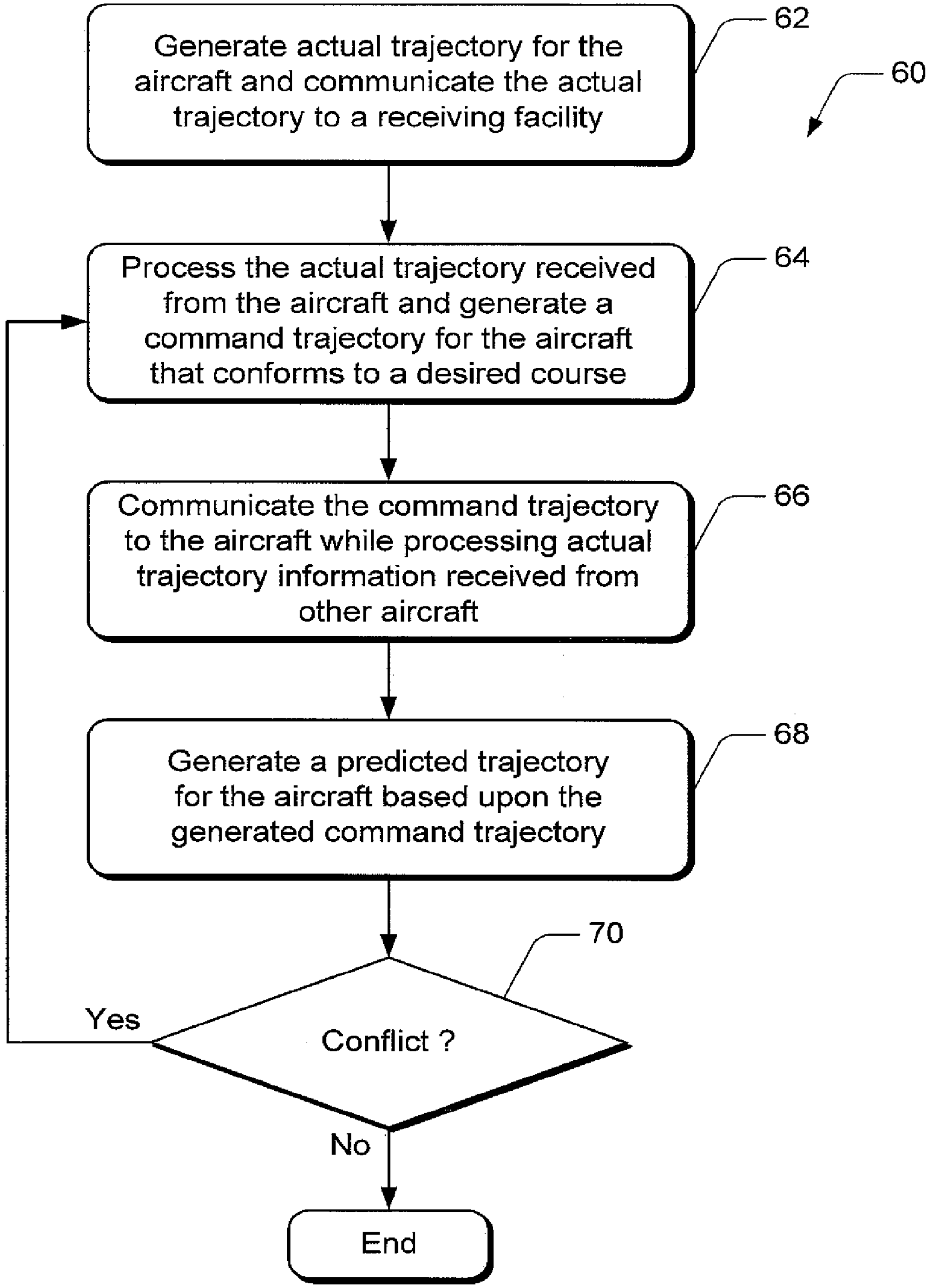
FIG. 5 is a flowchart that describes a method of representing a flight vehicle in a controlled environment, according to still another embodiment of the invention.

FIG. 5 is a flowchart that will be used to describe a method 60 of representing a flight vehicle in a controlled environment, according to still another embodiment of the invention. At block 62, an actual trajectory matrix is generated for the aircraft and the actual trajectory matrix is communicated to a receiving facility, such as the ground facility 18 shown in FIG. 1, or even another aircraft 12 in the controlled environment 14, also as shown in FIG. 1. As described in greater detail above, the actual trajectory matrix includes the actual position, an actual rate, and a flight attitude for the aircraft, in addition to other aircraft-related parameters. At block 64, the received actual trajectory matrix is processed to generate a command trajectory matrix. Again, as discussed more fully above, the command trajectory matrix provides a commanded position to the aircraft, a commanded rate necessary to conform to the commanded position, as well as other information. At block 66, the command trajectory matrix is communicated to the aircraft, while actual trajectory information for other aircraft is processed. Based upon the generated command trajectory matrix, and the actual trajectory matrix information obtained from other aircraft operating in the controlled environment 14 (FIG. 1), a predicted trajectory matrix is generated, as shown at block 68. At block 70, the predicted trajectory matrix is compared with the command trajectory matrix to determine if one or more flight conflicts exist. For example, if the comparison of the command trajectory matrix with the predicted trajectory matrix indicates that a required minimum aircraft spacing and/or a required minimum required altitude will fail to be maintained along the command trajectory, a new command trajectory matrix is generated by branching to block 64.

While various embodiments of the invention have been illustrated and described, as noted above, many changes can be made without departing from the spirit and scope of the invention. Accordingly, the scope of the invention is not limited by the disclosure of the various embodiments. Instead, the invention should be determined entirely by reference to the claims that follow.

What is claimed is:

1. A system for representing a flight vehicle in a controlled environment, comprising:

- means for generating trajectory data for the flight vehicle, the trajectory data including predicted trajectory of the vehicle; and
- means for communicating the trajectory data between a receiving facility and the flight vehicle;
- wherein the predicted trajectory is used to increase reliability of at least one of data communications and commanded trajectory of the vehicle during flight.

2. The system of claim 1, wherein the trajectory data further includes a commanded trajectory.

3. The system of claim 2, wherein the means for generating the trajectory data includes a processor for processing an actual trajectory matrix, a command trajectory matrix and a predicted trajectory matrix, and for comparing the command trajectory matrix with the predicted trajectory matrix and altering the command trajectory matrix based upon the comparison.

4. The system of claim 1, wherein the receiving facility includes at least one of an air-route traffic control center (ARTCC), a terminal radar approach control facility (TRACON), a flight service station (FSS) and a control tower.

5. The system of claim 1, wherein the actual trajectory includes at least one of an actual positional vector, an actual rate vector, an aircraft identification vector, an aircraft attitude vector and a frequency vector.

6. The system of claim 2, wherein the commanded trajectory includes at least one of a command positional vector, a command rate vector, a command deviation vector and a command frequency vector.

7. The system of claim 1, wherein the predicted trajectory includes at least one of a predicted spacing vector and an altitude vector.

8. The system of claim 1, wherein the means for generating the trajectory data includes at least one processor that is positioned in at least one of the ground-based facility and the flight vehicle.

9. The system of claim 1, wherein the means for communicating the trajectory data includes equipment for communicating via at least one of a communications satellite and an aerostat, the equipment operable to relay the trajectory data between the ground-based facility and the flight vehicle.

10. The system of claim 1, wherein the means for communicating the trajectory data includes an aircraft communications and reporting system (ACARS).

11. The method of claim 1, wherein the actual and predicted trajectories are determined on-board the flight vehicle and sent to the ground facility.

12. A method of representing a flight vehicle in a controlled environment, comprising:

generating an actual trajectory for the flight vehicle and communicating the actual trajectory to a receiving facility;

compiling a command trajectory that conforms to a desired course and altitude for the flight vehicle and a predicted trajectory that includes at least a minimum spacing between flight vehicles within the controlled environment; communicating the command trajectory to the flight vehicle;

comparing the command trajectory to the predicted trajectory to determine if a conflict exists; and if a conflict exists, altering the command trajectory to remove the conflict.

13. The method of claim 12, wherein generating an actual trajectory further comprises generating an actual trajectory matrix that includes at least one of an actual positional vector, an actual rate vector, an aircraft identification vector, an aircraft attitude vector and a frequency vector.

14. The method of claim 12, wherein compiling a command trajectory further comprises compiling a command trajectory matrix that includes at least one of a command positional vector, a command rate vector, a command deviation vector and a command frequency vector.

15. The method of claim 12, wherein compiling a predicted trajectory further comprises compiling a predicted trajectory matrix that includes at least one of a predicted spacing vector and an altitude vector.

16. The method of claim 12, wherein the predicted trajectory is a function of an actual trajectory from at least one other flight vehicle.

17. The method of claim 12, wherein communicating the command trajectory to the flight vehicle further comprises communicating the command trajectory between a ground-based facility and the flight vehicle.

18. A system for managing a plurality of flight vehicles in a controlled airspace environment, comprising:

a ground-based facility operable to receive actual trajectory data from each of the flight vehicles and generate command trajectory data for each of the flight vehicles, the facility communicating the command trajectory data to the vehicles, predicted trajectory data also being communicated between the facility and the vehicles, the communicated data used to enhance reliability of at least one of data communications and commanded trajectory of the vehicles during flight.

19. The system of claim 18, wherein the actual and predicted trajectory data is used to increase reliability with respect to communicatons latency.

20. The system of claim 18, wherein the actual and predicted trajectory data is used to increase reliability with respect to aircraft control and safety.

* * * * *

UNITED STATES PATENT AND TRADEMARK OFFICE

CERTIFICATE OF CORRECTION

PATENT NO. : 7,457,690 B2
APPLICATION NO. : 11/304229
DATED : November 25, 2008
INVENTOR(S) : Robert C. Wilson, Jr., Ted D. Whitley and Regina I. Estkowski It is certified that error appears in the above-identified patent and that said Letters Patent is hereby corrected as shown below:

Title Page, Item (73) Assignee should read —

The Boeing Company
Residence: Chicago, IL

Signed and Sealed this

Eighth Day of September, 2009

David J. Kappos

David J. Kappos
*Director of the United States Patent and Trademark Office*